(12) United States Patent
Barany et al.

(10) Patent No.: US 9,276,909 B2
(45) Date of Patent: Mar. 1, 2016

(54) INTEGRITY PROTECTION AND/OR CIPHERING FOR UE REGISTRATION WITH A WIRELESS NETWORK

(75) Inventors: Peter Anthony Barany, San Diego, CA (US); Lakshminath R. Dondeti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 1042 days.

(21) Appl. No.: 12/436,435

(22) Filed: May 6, 2009

(65) Prior Publication Data

US 2010/0054472 A1    Mar. 4, 2010

Related U.S. Application Data

(60) Provisional application No. 61/092,217, filed on Aug. 27, 2008.

(51) Int. Cl.
*H04L 29/06* (2006.01)
*H04W 12/02* (2009.01)
*H04W 12/10* (2009.01)

(52) U.S. Cl.
CPC .......... *H04L 63/0428* (2013.01); *H04L 63/123* (2013.01); *H04W 12/02* (2013.01); *H04W 12/10* (2013.01)

(58) Field of Classification Search
USPC ........................................................ 380/270
See application file for complete search history.

(56) References Cited

U.S. PATENT DOCUMENTS 5,841,873 A * 11/1998 Lockhart .................. H04L 9/16
380/270
7,373,508 B1    5/2008 Meier et al.
8,195,158 B2 * 6/2012 Regnier .............. H04L 65/1073
370/338
2003/0148779 A1 * 8/2003 Aravamudan .......... H04L 29/06
455/519

(Continued)

FOREIGN PATENT DOCUMENTS

JP    2004535004 A    11/2004
JP    2005236490 A    9/2005

(Continued)

OTHER PUBLICATIONS

3GPP TDocs (written contributions) at meeting, Meeting: S3-50—Feb. 25, 2008 to Feb. 29, 2008, Sanya, S3-080176 "Storing NAS security context at power down" Qualcomm Europe.*

(Continued)

*Primary Examiner* — Harris C Wang

(57) ABSTRACT

Techniques for performing registration with a wireless network using integrity protection and/or ciphering are described. A user equipment (UE) may perform a security procedure with the wireless network for a first session and may generate UE security context data at the UE. The UE security context data may include a cipher key used for ciphering, an integrity key used for integrity protection, a temporary UE identity, and/or other information. The UE may use the UE security context data for secure communication with the wireless network during the first session. The UE may store the UE security context data upon termination of the first session. The UE may thereafter use the stored UE security context data for registration with the wireless network for a second session following the first session. The UE may perform integrity protection and/or ciphering for message(s) for registration based on the stored UE security context data.

35 Claims, 10 Drawing Sheets

(56) References Cited

U.S. PATENT DOCUMENTS

| | | | | |
|---|---|---|---|---|
| 2007/0249352 | A1* | 10/2007 | Song | H04L 63/08 455/436 |
| 2008/0065777 | A1* | 3/2008 | Sherkin | H04L 63/0823 709/229 |
| 2009/0111428 | A1* | 4/2009 | Blommaert | H04W 12/04 455/411 |
| 2009/0170512 | A1* | 7/2009 | Regnier | H04L 67/145 455/435.1 |
| 2010/0054472 | A1* | 3/2010 | Barany | H04L 63/0428 380/270 |
| 2012/0047367 | A1* | 2/2012 | Han | H04W 12/04 713/171 |
| 2015/0223284 | A1* | 8/2015 | Jain | H04W 76/046 370/329 |

FOREIGN PATENT DOCUMENTS

| | | |
|---|---|---|
| JP | 2008054102 A | 3/2008 |
| WO | WO-02102023 A1 | 12/2002 |
| WO | WO2007008976 | 1/2007 |
| WO | WO-2008005162 A2 | 1/2008 |
| WO | WO2008028299 | 3/2008 |

OTHER PUBLICATIONS

Sankaran, C. B. "Network access security in next-generation 3GPP systems: A tutorial." Communications Magazine, IEEE 47.2 (2009): 84-91.*

3GPP S3: "Universal Mobile Telecommunications System (UMTS) ; 36 security; Security architecture (3GPP TS 33.102 version 5.4.0 Release 5); ETSI TS 133 102" ETSI Standards, European Telecommunications Standards Institute, Sophia-Antipo, FR, vol. 3-SA3, No. V540, Jun. 2004, pp. 1-62, XP014017591.

3GPP TS 33.102 Version 5.2.0, France, European Telecommunications Standards Institute, Jun. 2003,V.3/SA3 N.V520.

Taiwan Search Report—TW098128886—TIPO—May 17, 2013.

Xing, Z., et al., "AKA-based authentication mechanism of IMS access", ZTE Technology, No. 6, Dec. 20, 2007.

* cited by examiner

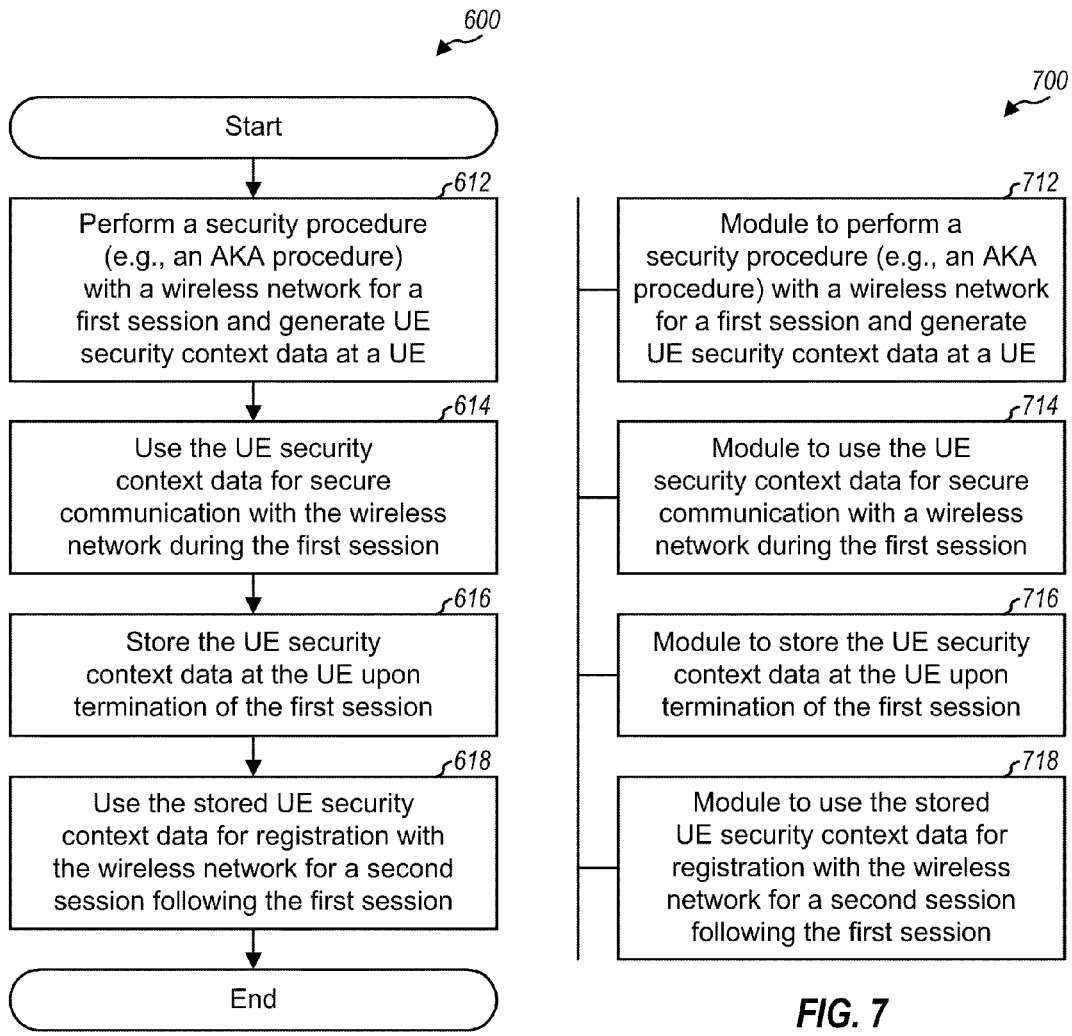

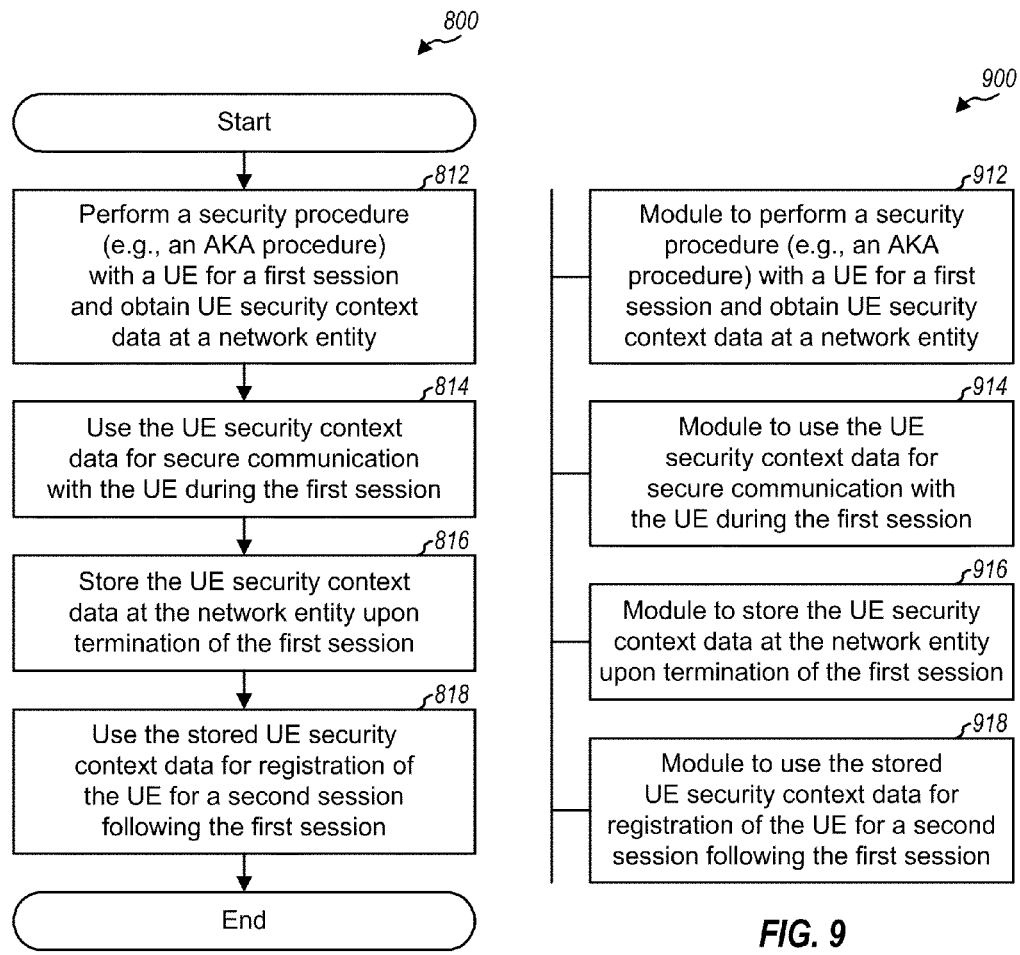

INTEGRITY PROTECTION AND/OR CIPHERING FOR UE REGISTRATION WITH A WIRELESS NETWORK

The present application claims priority to provisional U.S. Application Ser. No. 61/092,217, entitled "INTEGRITY PROTECTION AND/OR CIPHERING FOR UE REGISTRATION WITH A WIRELESS NETWORK," filed Aug. 27, 2008, assigned to the assignee hereof and incorporated herein by reference.

BACKGROUND

I. Field

The present disclosure relates generally to communication, and more specifically to techniques for performing registration with a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may support communication for a number of user equipments (UEs). A UE may perform registration with the wireless network (e.g., upon being powered on) in order to receive communication services. It is desirable to perform registration in an efficient manner.

SUMMARY

Techniques for performing registration with a wireless network using integrity protection and/or ciphering are described herein. Ciphering may be used to securely send information that needs to be kept confidential. Integrity protection may be used for a message so that a recipient can be sure that the content of the message has not been tampered by a third party. The use of ciphering and/or integrity protection for registration may provide certain advantages such as a faster registration process, reduced signaling, etc.

In one design, a UE may perform a security procedure with a wireless network for a first session and may generate UE security context data at the UE. The UE security context data may include a cipher key used for ciphering, an integrity key used for integrity protection, a temporary UE identity, and/or other information. The UE may use the UE security context data for secure communication with the wireless network during the first session. The UE may store the UE security context data upon termination of the first session. The UE may perform de-registration at the end of the first session and may power down after the first session.

The UE may thereafter use the stored UE security context data for registration with the wireless network for a second session following the first session. The UE may perform integrity protection and/or ciphering for at least one message based on the stored UE security context data. In one design, the UE may cipher at least one parameter of a registration message based on the cipher key and may integrity protect the entire registration message based on the integrity key. The UE may send the integrity protected and/or ciphered message(s) to the wireless network for registration of the UE.

Various aspects and features of the disclosure are described in further detail below.

BRIEF DESCRIPTION OF THE DRAWINGS

FIGS. 6 and 7 show a process and an apparatus, respectively, for performing registration with integrity protection and/or ciphering.
FIGS. 8 and 9 show a process and an apparatus, respectively, for supporting UE registration with integrity protection and/or ciphering.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
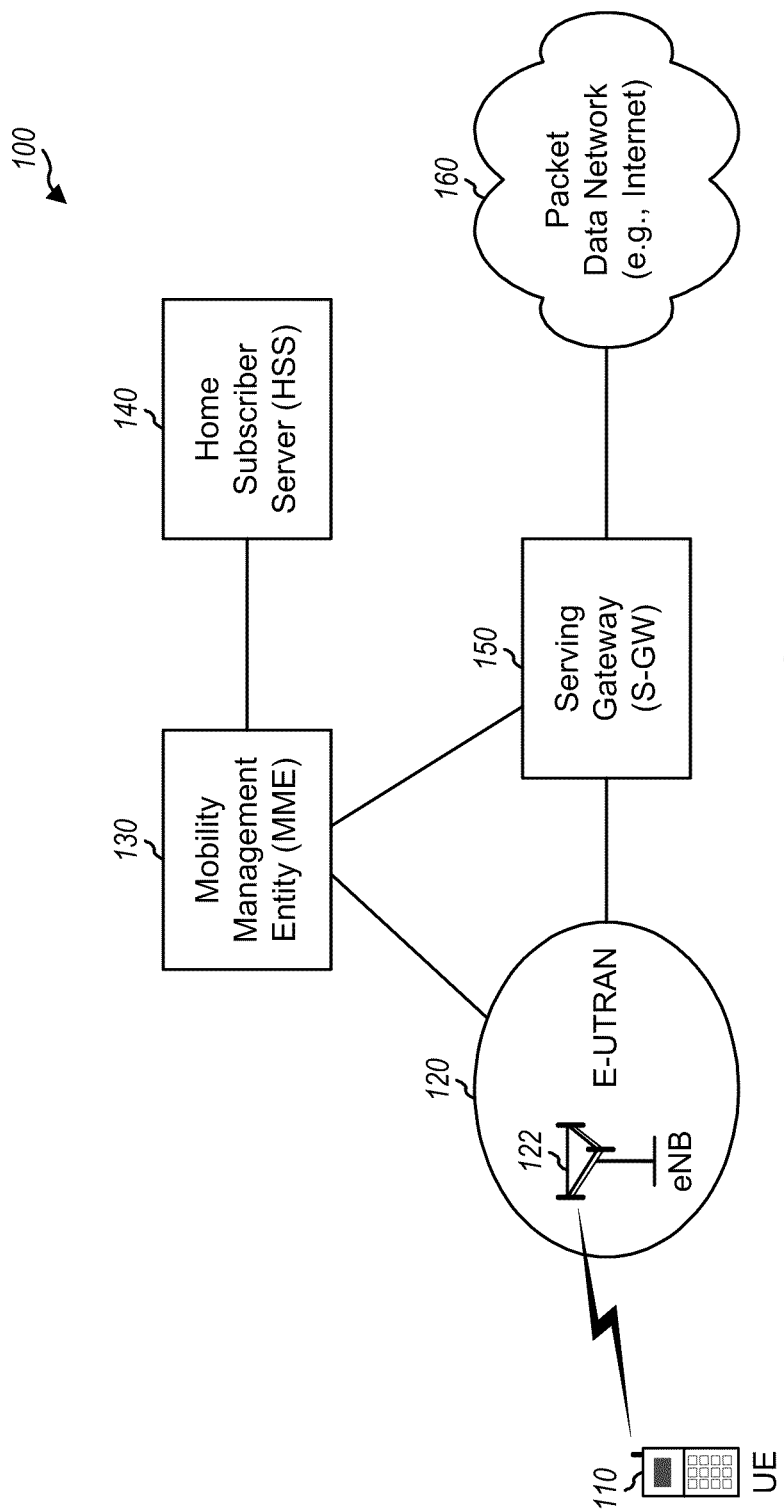
FIG. 1 shows a wireless communication network.

FIG. 1 shows a wireless communication network 100, which may be a public land mobile network (PLMN) that implements LTE. Wireless network 100 may include an Evolved Universal Terrestrial Radio Access Network (E-UTRAN) 120, a Mobility Management Entity (MME) 130, a Home Subscriber Server (HSS) 140, and a serving gateway (S-GW) 150. E-UTRAN 120 may include a number of evolved Node Bs (eNBs) that support radio communication for UEs. For simplicity, only one eNB 122 is shown in FIG. 1. An eNB may be a fixed station that communicates with the UEs and may also be referred to as a Node B, a base station, an access point, etc.

MME 130 may perform various functions such as control of signaling and security for a Non Access Stratum (NAS), authentication and mobility management of UEs, selection of gateways for UEs, bearer management functions, etc. NAS is a functional layer running between a UE and a core network and supports traffic and signaling messages between the UE and the core network. HSS 140 may store subscription-related information (e.g., user profiles) and location information for UEs that have service subscriptions in wireless network 100. HSS 140 may perform authentication and authorization of UEs and may provide information for UEs to requesting network entities. Serving gateway 150 may support data services such as packet data, Voice-over-IP (VoIP), video, messaging, etc. Serving gateway 150 may perform various functions such as support for handover between eNBs, buffering, routing and forwarding of data for UEs, initiation of network-triggered service request procedures, accounting functions for charging, etc. Serving gateway 150 may couple to a packet data network (PDN) 160 (e.g., the Internet) and may communicate with other entities (e.g., remote servers and terminals) that couple to PDN 160.

The functions of E-UTRAN 120, MME 130, HSS 140, and serving gateway 150 are described in 3GPP TS 36.300, entitled "Evolved Universal Terrestrial Radio Access (E-UTRA) and Evolved Universal Terrestrial Radio Access Network (E-UTRAN); Overall description; Stage 2," and in 3GPP TS 23.401, entitled "General Packet Radio Service (GPRS) enhancements for Evolved Universal Terrestrial Radio Access Network (E-UTRAN) access." These documents are publicly available from 3GPP.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, etc. UE 110 may communicate with eNBs within E-UTRAN 120. UE 110 may have a service subscription with wireless network 100 and may have its subscription-related information stored in HSS 140. UE 110 may be able to receive one or more data services such as Internet connectivity, short message service (SMS), instant messaging (IM), wireless application protocol (WAP) access, multimedia streaming, multimedia messaging, etc.

Figure 2:
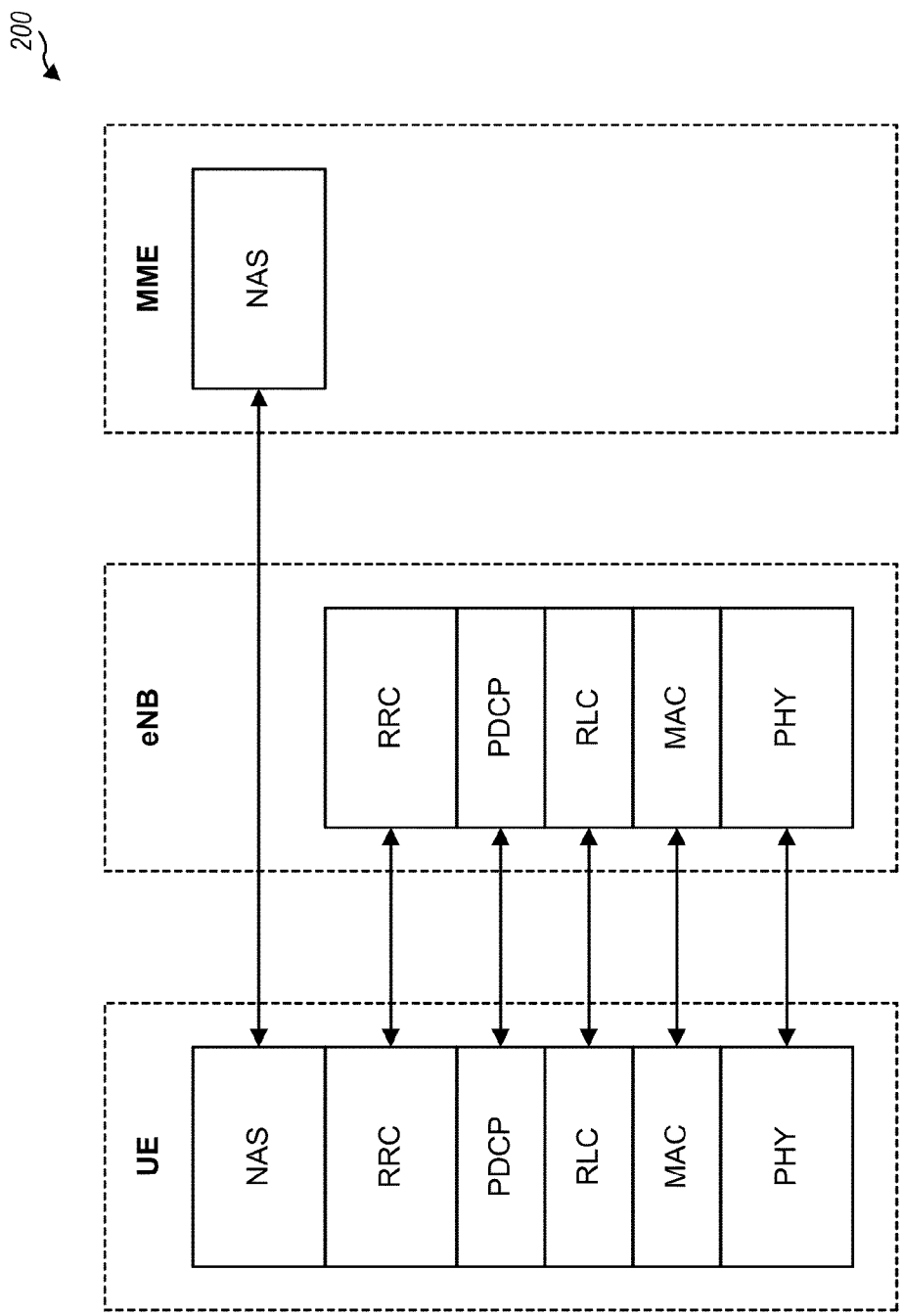
FIG. 2 shows example protocol stacks for a control plane.

FIG. 2 shows example protocol stacks 200 for a control plane in LTE. The control plane carries signaling messages exchanged between UE 110 and E-UTRAN 120 and between UE 110 and MME 130. As shown in FIG. 2, UE 110 may exchange messages with MME 130 via NAS control protocol. NAS may perform various functions such as data bearer management, authentication, mobility handling, paging origination, security control, etc. UE 110 may exchange messages with an eNB within E-UTRAN 120 via Radio Resource Control (RRC). RRC may perform various functions such as RRC connection management, radio bearer control, mobility functions, UE measurement reporting and control, broadcast, paging, etc. RRC messages may be sent via Packet Data Convergence Protocol (PDCP), Radio Link Control (RLC), Medium Access Control (MAC), and physical layer (PHY). The control plane for LTE is described in the aforementioned 3GPP TS 36.300.

UE 110 may perform an attach procedure and register with wireless network 100, e.g., when the UE is powered on. UE 110 may send a registration message as part of the attach procedure. The registration message may also be referred to as an Attach Request message, etc. The registration message is typically sent in the clear, i.e., without integrity protection or ciphering. Integrity protection is a process to ensure that information has not been tampered. This may be achieved by having (i) a transmitter securely generates a message authentication code (MAC) over information to be integrity protected and (ii) a receiver using the MAC to check that the information has not been tampered. Ciphering is a process of converting original information (often referred to as plaintext) into encrypted information (often referred to as ciphertext) containing the original information but not in a format readable by a human or a computer without proper deciphering mechanism. Ciphering is also commonly referred to as encryption. Various cryptographic keys may be used for integrity protection and ciphering, as described below.

In an aspect, UE 110 may perform integrity protection and/or ciphering for messages sent for registration. UE 110 may cipher information that needs to be kept confidential and may send the ciphered information in a registration message. The use of ciphering may allow UE 110 to include certain information in the registration message which would normally not be included because the information needs to be kept confidential. Sending such information in the registration message may (i) speed up the registration process and subsequent bearer activation process and (ii) increase network capacity because less signaling may be required. UE 110 may also integrity protect the entire registration message so that the network can be sure that the content of the message has not been tampered by a third party.

In one design, UE 110 and a network entity such as MME 130 may store UE security context data upon de-registration and subsequent power-down procedures. UE 110 and MME 130 may thereafter re-use the stored UE security context data to protect a registration message during power-up and subsequent registration procedures. The UE security context data may also be referred to as NAS security context information, security information, etc. In another design, UE 110 and MME 130 may re-generate the UE security context data upon power-up and subsequent registration procedures and may use the regenerated UE security context data to protect a registration message. The regenerated UE security context data may or may not be identical to the UE security context data used during a previous session, which was terminated by the previous de-registration and subsequent power-down procedures.

Figure 3:
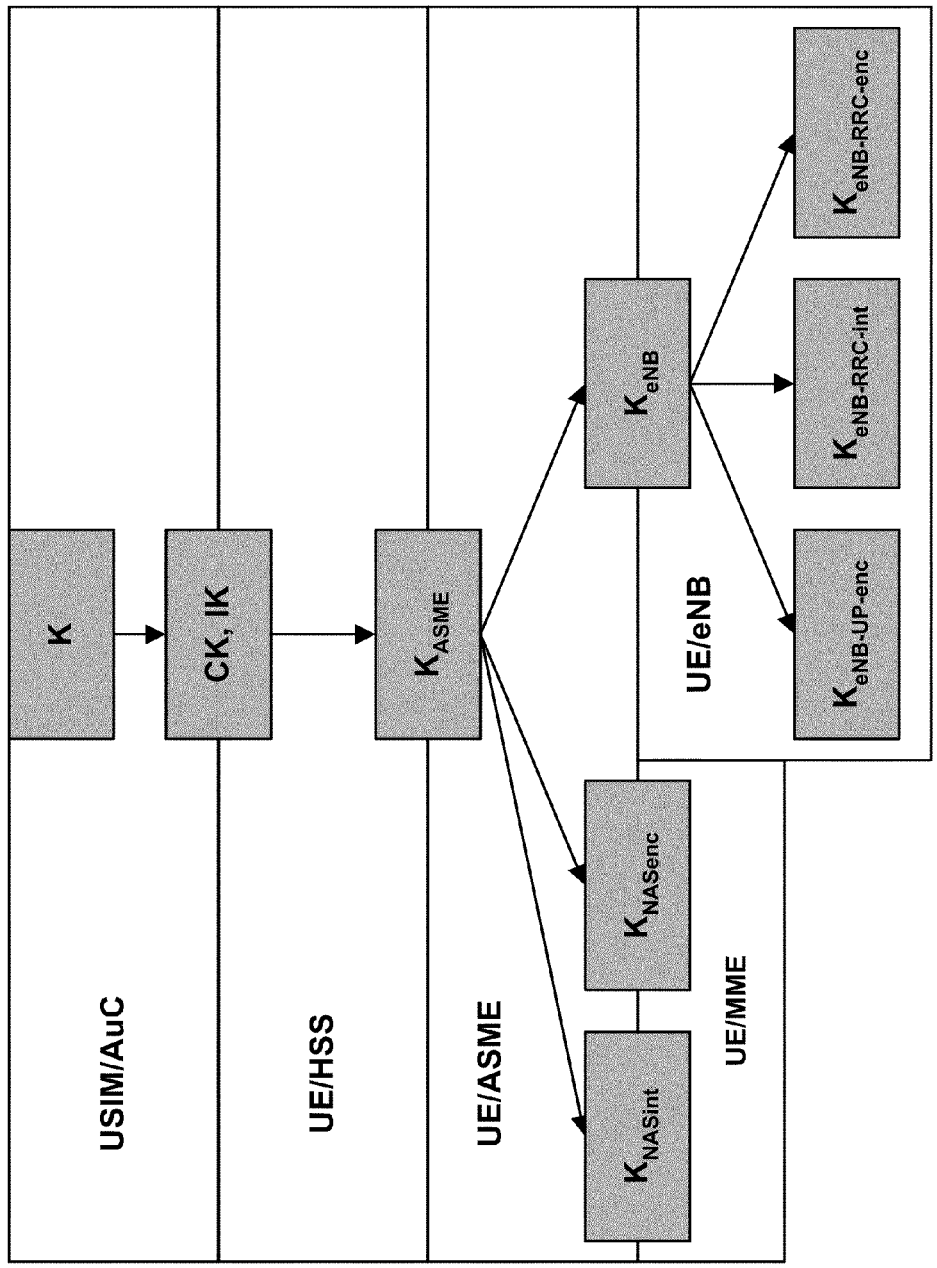
FIG. 3 shows a cryptographic key hierarchy.

FIG. 3 shows a cryptographic key hierarchy that may be used for communication between UE 110 and wireless network 100. A Universal Subscriber Identity Module (USIM) for UE 110 and an Authentication Centre (AuC) for wireless network 100 may share a long-term secret key denoted as K. The secret key K may also be referred to as a shared secret key, a pre-shared key, etc. The secret key K may be used to generate a cipher key denoted as CK and an integrity key denoted as IK, e.g., when UE 110 performs an Authentication and Key Agreement (AKA) procedure. The AKA procedure uses a permanent UE identity, which may be an International Mobile Subscriber Identity (IMSI). The CK and IK keys may be used to derive an Access Security Management Entity (ASME) base key denoted as $K_{ASME}$, which may be provided to MME 130.

The $K_{ASME}$ key may be used to generate session keys denoted as $K_{NASint}$ and $K_{NASenc}$. The $K_{NASint}$ key may be used for integrity protection and the $K_{NASenc}$ key may be used for ciphering of NAS signaling messages, such as registration messages, exchanged between UE 110 and MME 130. The $K_{ASME}$ key may also be used to generate an eNB key denoted as $K_{eNB}$, which may be passed to a serving eNB for UE 110. Additional eNB keys such as $K_{eNB\text{-}UP\text{-}enc}$, $K_{eNB\text{-}RRC\text{-}int}$, and $K_{eNB\text{-}RRC\text{-}enc}$ keys may be generated by UE 110 and the serving eNB from the $K_{eNB}$ key and may be used for secure communication between the UE and the eNB. The various cryptographic keys shown in FIG. 3 are described in the aforementioned 3GPP TS 36.300.

A design for supporting UE registration with integrity protection and/or ciphering is described below. For simplicity, MME 130 and HSS 140 are collectively denoted as MME/HSS, and the communication between MME 130 and HSS 140 is omitted in the description below. A given step in the description below may be performed by MME 130, or HSS 140, or both MME 130 and HSS 140.

Figure 4A:
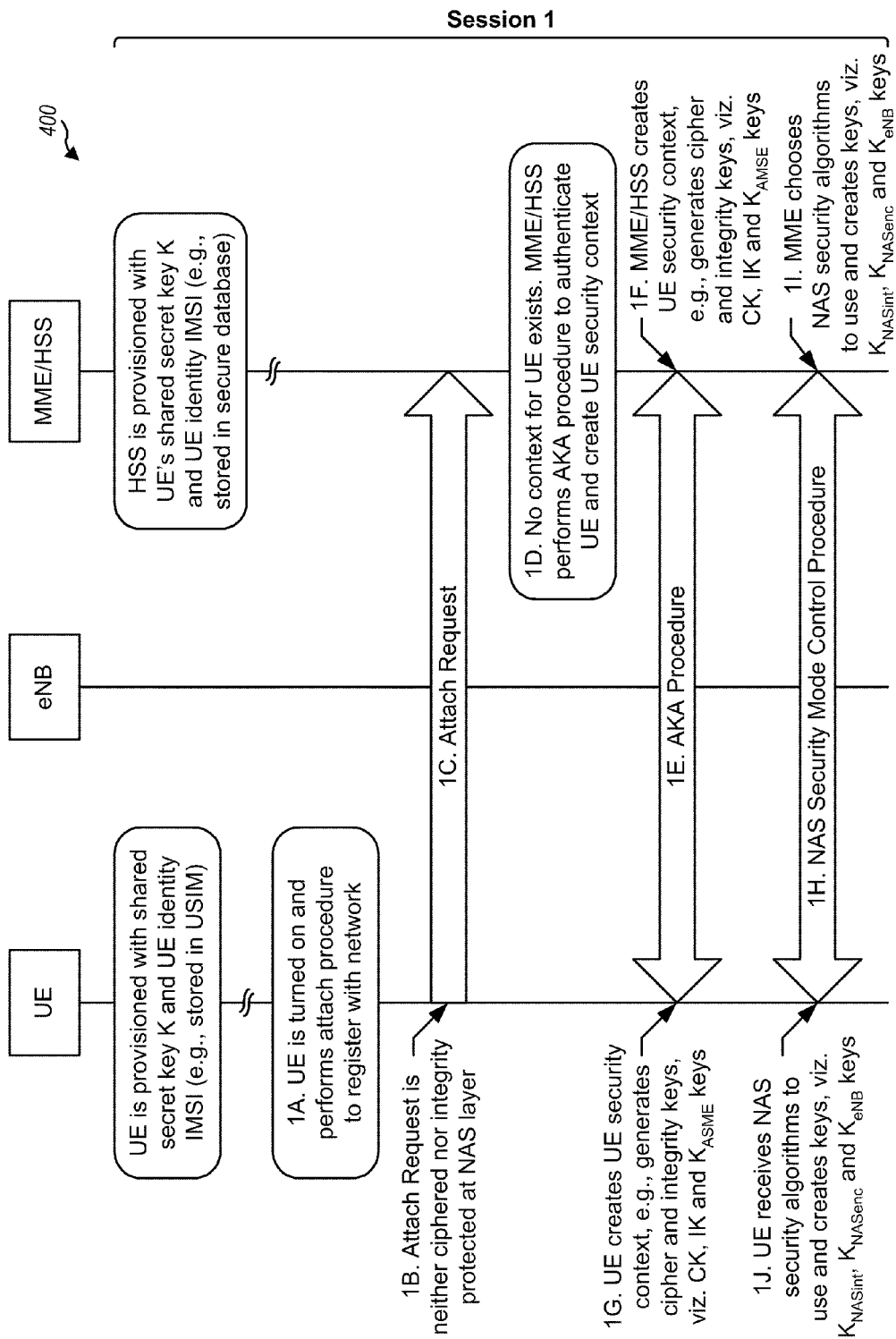
FIGS. 4A and 4B show a call flow for UE registration without integrity protection or ciphering.
Figure 4B:
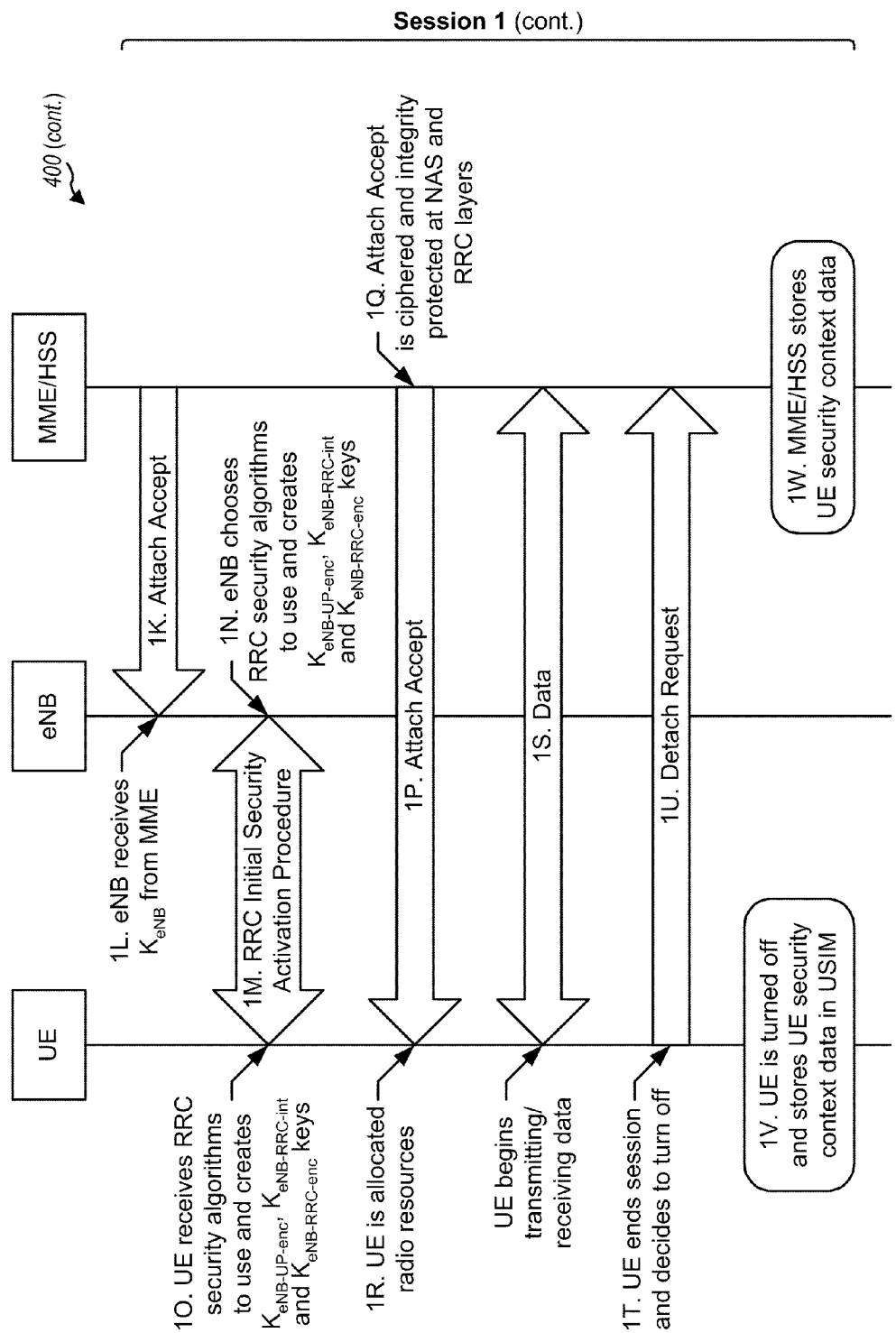

FIGS. 4A and 4B show a call flow 400 for communication between UE 110, an eNB in E-UTRAN 120, and the MME/HSS for a data session. As shown in FIG. 4A, UE 110 may be provisioned with a long-term secret key K and a permanent UE identity (e.g., an IMSI), both of which may be stored in a USIM on a Universal Integrated Circuit Card (UICC). HSS 140 may also be provisioned with the same long-term secret key K and the permanent UE identity for UE 110, both of which may be stored in a secure database at HSS 140.

At some point in time, the UE may be powered on and may perform an attach procedure to register with the network (step 1A). The UE may generate an Attach Request message (which is a registration message) without using ciphering or integrity protection (step 1B). The UE may send the Attach Request message to the MME/HSS as part of the attach procedure (step 1C). The MME/HSS may receive the Attach Request message from the UE and may determine that no context for the UE exists at the MME/HSS (step 1D). The MME/HSS and the UE may then perform an AKA procedure to authenticate the UE and create UE security context (step 1E). For the AKA procedure, the MME/HSS may create the UE security context, which may include generation of the cipher key CK, the integrity key IK, and the base key $K_{ASME}$ for the UE at the MME/HSS (step 1F). The UE may also locally create the UE security context, which may include generation of the CK, IK and $K_{ASME}$ keys at the UE (step 1G).

After completing the AKA procedure, the MME and the UE may perform an NAS Security Mode Control Procedure to configure security for NAS (step 1H). For this procedure, the MME may choose NAS security algorithms to use and may create the $K_{NASint}$, $K_{NASenc}$ and $K_{eNB}$ keys (step 1I). The UE may receive the NAS security algorithms to use from the MME and may locally create the $K_{NASint}$, $K_{NASenc}$ and $K_{eNB}$ keys (step 1J).

FIG. 4B shows the continuation of call flow 400. After completing the NAS Security Mode Control Procedure, the MME/HSS may return an Attach Accept message with the $K_{eNB}$ key to the eNB (step 1K). The eNB may receive the $K_{eNB}$ key from the MME (step 1L). The eNB and the UE may then perform an RRC Initial Security Activation Procedure to configure security for RRC (step 1M). For this procedure, the eNB may choose RRC security algorithms to use and may create the $K_{eNB-UP-enc}$, $K_{eNB-RRC-int}$ and $K_{eNB-RRC-enc}$ keys (step 1N). The UE may receive the RRC security algorithms to use from the eNB and may locally create the $K_{eNB-UP-enc}$, $K_{eNB-RRC-int}$ and $K_{eNB-RRC-enc}$ keys (step 1O).

The UE may receive an Attach Accept message (step 1P), which may be ciphered and integrity protected at both NAS and RRC layers (step 1Q). The UE may also be allocated radio resources (step 1R) and may exchange data with the MME via the eNB (step 1S). At some point, the UE may decide to end the data session and turn off (step 1T). The UE may send a Detach Request message to the MME/HSS (step 1U). The UE may be turned off and may store the UE security context data in a secure non-volatile memory within the USIM (step 1V). The MME/HSS may also store the UE security context data in the secure database (step 1W).

In one design, the UE and the MME/HSS may each store the UE security context data upon de-registration and subsequent power down procedures. The UE security context data may include the following:

Cipher key (CK)—session key used for ciphering,
Integrity key (IK)—session key used for integrity protection,
Key set identifier (KSI)—a number allocated by the network during authentication and associated with the cipher and integrity keys, and
Temporary Mobile Subscriber Identity (TMSI)—a temporary UE identity.

The UE and the MME/HSS may also store other information upon de-registration and power down. For example, the UE and the MME/HSS may store the $K_{ASME}$ key, the NAS keys, and/or the eNB key. The UE and the MME/HSS may also store other cryptographic keys and/or other information used for integrity protection and/or ciphering.

Figure 5A:
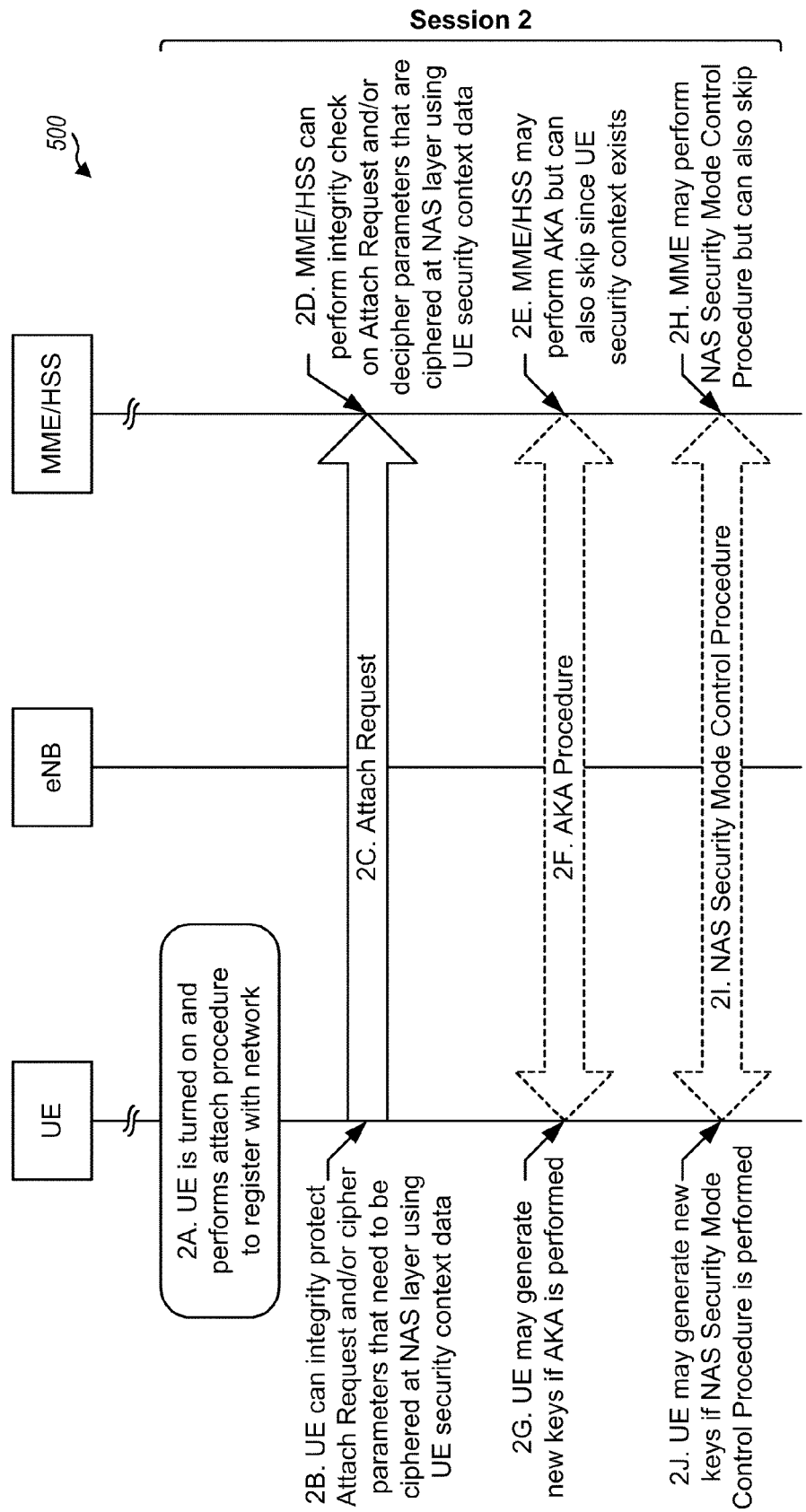
FIGS. 5A and 5B show a call flow for UE registration with integrity protection and/or ciphering.
Figure 5B:
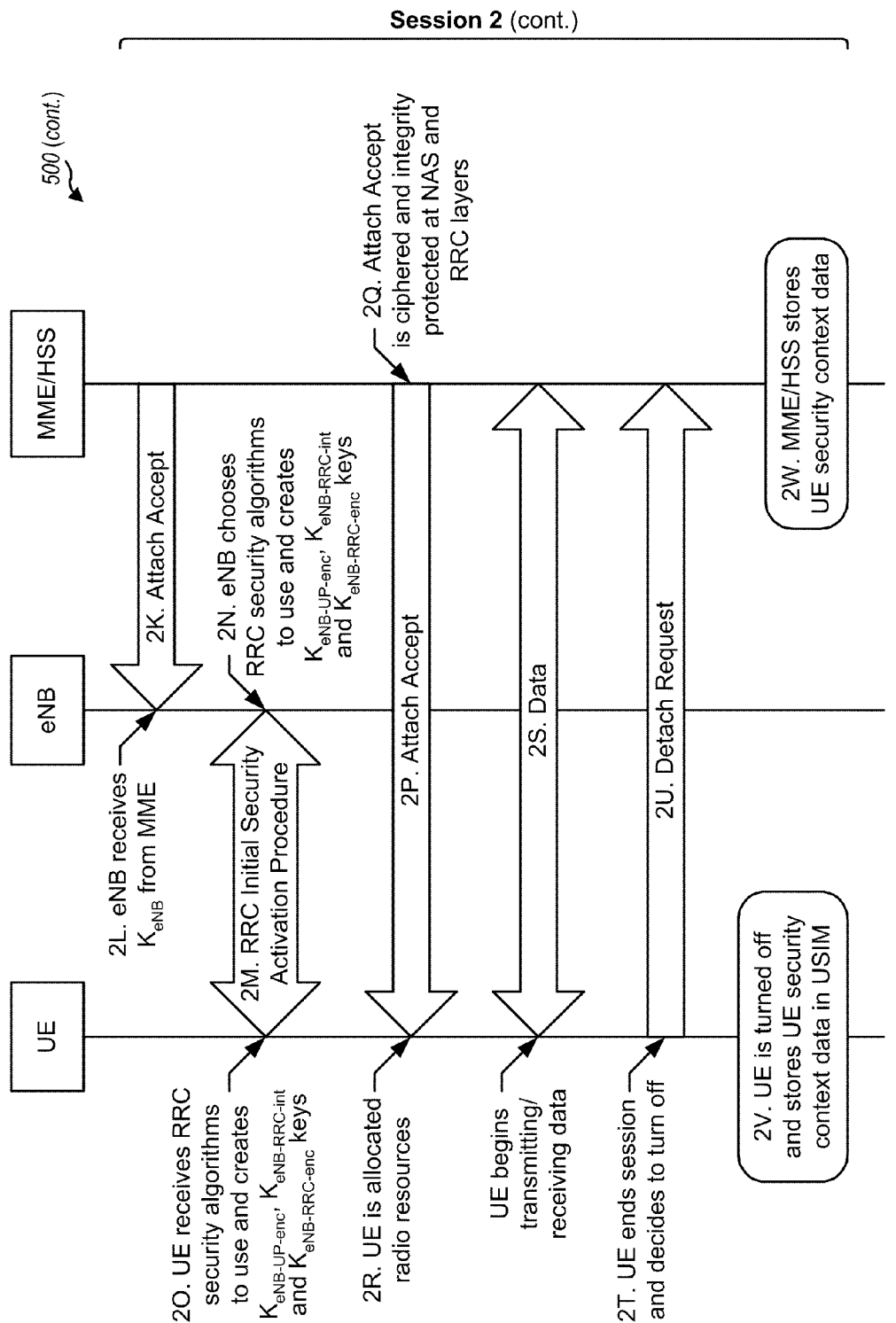

FIGS. 5A and 5B show a call flow 500 for communication between UE 110, an eNB in E-UTRAN 120, and the MME/HSS for a subsequent data session. As shown in FIG. 5A, the UE may be turned on and may perform an attach procedure to register with the network (step 2A). The UE may perform integrity protection and/or ciphering for an Attach Request message at the NAS layer using the stored UE security context data (step 2B). In one design, the UE may cipher parameters that need to be ciphered and may integrity protect the Attach Request message using the stored UE security context data. In another design, the UE may cipher the entire Attach Request message.

The UE may send the integrity protected and/or ciphered Attach Request message to the MME/HSS (step 2C). The MME/HSS may receive the Attach Request message and perform the complementary security processing based on the stored UE security context at the MME/HSS (step 2D). In one design, the MME/HSS may perform integrity check on the Attach Request message at the NAS layer using the integrity key and may decipher the parameters that are ciphered by the UE using the cipher key stored by the MME/HSS for the UE security context. The MME/HSS may also use the stored UE security context for secure communication with the UE in the current data session. Alternatively, the MME/HSS may perform an AKA procedure with the UE to generate fresh cipher and integrity keys (steps 2E, 2F and 2G). The MME may also perform the NAS Security Mode Control Procedure with the UE to generate fresh $K_{NASint}$, $K_{NASenc}$ and $K_{eNB}$ keys (steps 2H, 2I and 2J) or may skip this procedure.

FIG. 5B shows the continuation of call flow 500. The MME/HSS may return an Attach Accept message with the $K_{eNB}$ key to the eNB (step 2K). The eNB may receive the $K_{eNB}$ key from the MME (step 2L). The eNB and the UE may then perform an RRC Initial Security Activation Procedure (step 2M). For this procedure, the eNB may choose RRC security algorithms to use and may create the $K_{eNB-UP-enc}$, $K_{eNB-RRC-int}$ and $K_{eNB-RRC-enc}$ keys (step 2N). The UE may receive the RRC security algorithms to use from the eNB and may locally create the $K_{eNB-UP-enc}$, $K_{eNB-RRC-int}$ and $K_{eNB-RRC-enc}$ keys (step 2O).

The UE may receive an Attach Accept message (step 2P), which may be ciphered and integrity protected at both NAS and RRC layers (step 2Q). The UE may also be allocated radio resources (step 2R) and may exchange data with the MME via the eNB (step 2S). At some point, the UE may decide to end the data session and turn off (step 2T). The UE may send a Detach Request message to the MME/HSS (step 2U). The UE may be turned off and may continue to store the UE security context data in the secure non-volatile memory within the USIM (step 2V). The MME/HSS may also continue to store the UE security context data in the secure database (step 2W).

As shown in FIGS. 5A and 5B, the security engine for protection of NAS signaling messages may reside in the UE and the MME/HSS. The storage (or re-generation) of the UE security context data in both the UE and the MME/HSS may make it possible for the UE to integrity protect and/or cipher an Attach Request message upon power-up and subsequent registration procedures.

FIG. 6 shows a design of a process 600 for performing registration with integrity protection and/or ciphering. Process 600 may be performed by UE 110 (as described below) or by some other entity.

The UE may perform a security procedure (e.g., an AKA procedure) with a wireless network for a first session and may generate UE security context data at the UE (block 612). The UE may use the UE security context data for secure communication with the wireless network during the first session (block 614). The UE may store the UE security context data (e.g., in a USIM) upon termination of the first session (block 616). The stored UE security context data may comprise a cipher key (CK) used for ciphering, an integrity key (IK) used for integrity protection, a key set identifier (KSI), a temporary UE identity (e.g., a TMSI), and/or other information. The UE may perform de-registration at the end of the first session and may power down after the first session.

The UE may use the stored UE security context data for registration with the wireless network for a second session following the first session (block 618). In one design, the UE may perform integrity protection for at least one message (e.g., a registration message) based on the stored UE security context data. The UE may then send the at least one integrity protected message to the wireless network for registration of the UE. In another design, the UE may cipher at least one message based on the stored UE security context data. The UE may then send the at least one ciphered message to the wireless network for registration of the UE. In yet another design, the UE may perform both ciphering and integrity protection. For example, the UE may cipher at least one parameter of a registration message (e.g., an Attach Request message) based on the cipher key and may integrity protect the entire registration message based on the integrity key in the stored UE security context data.

FIG. 7 shows a design of an apparatus 700 for performing UE registration with integrity protection and/or ciphering. Apparatus 700 includes a module 712 to perform a security procedure (e.g., an AKA procedure) with a wireless network for a first session and to generate UE security context data at a UE, a module 714 to use the UE security context data for secure communication with the wireless network during the first session, a module 716 to store the UE security context data at the UE upon termination of the first session, and a module 718 to use the stored UE security context data for registration with the wireless network for a second session following the first session.

FIG. 8 shows a design of a process 800 for supporting UE registration with integrity protection and/or ciphering. Process 800 may be performed by a network entity, e.g., MME 130 and/or HSS 140.

The network entity may perform a security procedure (e.g., an AKA procedure) with a UE for a first session and may obtain UE security context data at the network entity (block 812). The network entity may use the UE security context data for secure communication with the UE during the first session (block 814). The network entity may store the UE security context data (e.g., in a secure database) upon termination of the first session (block 816). The stored UE security context data may comprise a cipher key (CK) used for ciphering, an integrity key (IK) used for integrity protection, a key set identifier (KSI), a temporary UE identity (e.g., a TMSI), and/or other information.

The network entity may use the stored UE security context data for registration of the UE for a second session following the first session (block 818). In one design, the network entity may receive at least one message (e.g., a registration message) that is integrity protected by the UE. The network entity may perform integrity check for the at least one message based on the stored UE security context data. In another design, the network entity may receive at least one message that is ciphered by the UE. The network entity may decipher the at least one message based on the stored UE security context data. In yet another design, the network entity may perform both deciphering and integrity check. For example, the network entity may receive a registration message from the UE, decipher at least one parameter of the registration message based on the cipher key, and perform integrity check for the entire registration message based on the integrity key in the stored UE security context data.

FIG. 9 shows a design of an apparatus 900 for supporting UE registration with integrity protection and/or ciphering. Apparatus 900 includes a module 912 to perform a security procedure (e.g., an AKA procedure) with a UE for a first session and obtain UE security context data at a network entity, a module 914 to use the UE security context data for secure communication with the UE during the first session, a module 916 to store the UE security context data at the network entity upon termination of the first session, and a module 918 to use the stored UE security context data for registration of the UE for a second session following the first session.

The modules in FIGS. 7 and 9 may comprise processors, electronics devices, hardware devices, electronics components, logical circuits, memories, etc., or any combination thereof.

The techniques described herein may provide certain advantages. First, the wireless network may avoid using additional vectors each time a UE powers up and performs registration. The vectors are used to generate the $K_{ASME}$ key and to authenticate the network to the UE, and vice versa. Second, less signaling may be exchanged between the UE and the wireless network for registration. Third, security protection may be used for messages sent for registration.

Figure 10:
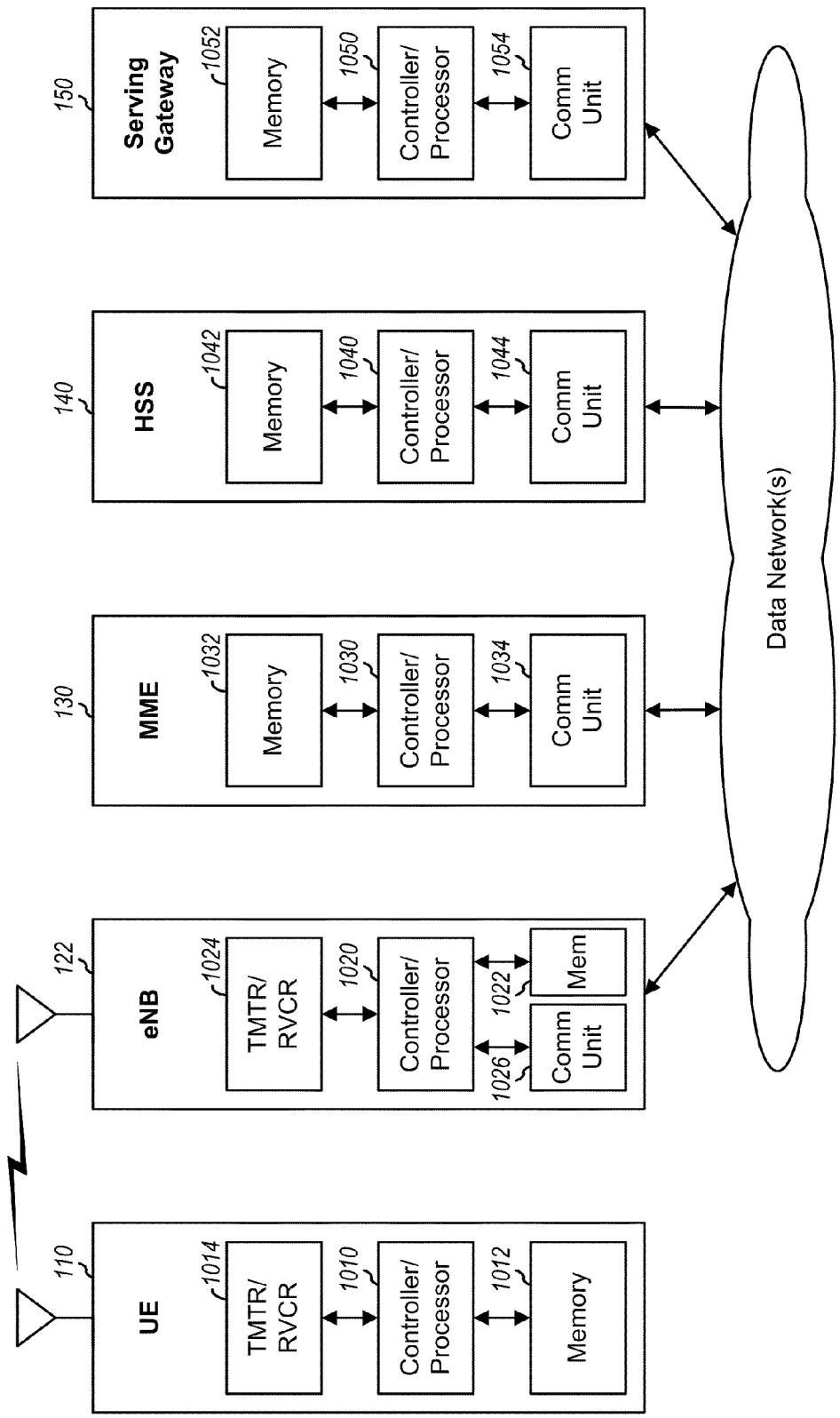
FIG. 10 shows a block diagram of various entities in FIG. 1.

FIG. 10 shows a block diagram of a design of UE 110, eNB 122 in E-UTRAN 120, MME 130, HSS 140, and serving gateway 150 in FIG. 1. For simplicity, FIG. 10 shows (i) one controller/processor 1010, one memory 1012, and one transmitter/receiver (TMTR/RCVR) 1014 for UE 110, (ii) one controller/processor 1020, one memory (Mem) 1022, one transmitter/receiver 1024, and one communication (Comm) unit 1026 for eNB 122, (iii) one controller/processor 1030, one memory 1032, and one communication unit 1034 for MME 130, (iv) one controller/processor 1040, one memory 1042, and one communication unit 1044 for HSS 140, and (v) one controller/processor 1050, one memory 1052, and one communication unit 1054 for serving gateway 150. In general, each entity may include any number of controllers, processors, memories, transceivers, communication units, etc.

On the downlink, eNB 122 may transmit data and messages to UEs within its coverage area. The data and messages may be processed by processor 1020 and conditioned by transmitter 1024 to generate a downlink signal, which may be transmitted to the UEs. At UE 110, the downlink signal from eNB 122 may be received and conditioned by receiver 1014, and further processed by processor 1010 to obtain the data and messages sent to UE 110. Memory 1012 may store program codes and data for UE 110. Processor 1010 may perform or direct process 600 in FIG. 6 and/or other processes for the techniques described herein. Processor 1010 may also perform the processing for the UE in call flow 400 in FIGS. 4A and 4B and call flow 500 in FIGS. 5A and 5B.

On the uplink, UE 110 may transmit data and messages to eNB 122. The data and messages may be processed by processor 1010 and conditioned by transmitter 1014 to generate an uplink signal, which may be transmitted to eNB 122. At eNB 122, the uplink signals from UE 110 and other UEs may be received and conditioned by receiver 1024 and further processed by processor 1020 to obtain data and messages sent by the UEs. Memory 1022 may store program codes and data for eNB 122. Communication unit 1026 may allow eNB 122 to communicate with other network entities. For example, communication unit 1026 may forward NAS signaling messages exchanged between UE 110 and MME 130, e.g., for registration.

Within MME 130, processor 1030 may perform processing for the MME, memory 1032 may store program codes and data for the MME, and communication unit 1034 may allow the MME to communicate with other entities. Processor 1030 may perform or direct all or part of process 800 in FIG. 8 and/or other processes for the techniques described herein. Processor 1030 may also perform all or part of the processing for the MME/HSS in call flow 400 in FIGS. 4A and 4B and call flow 500 in FIGS. 5A and 5B. Memory 1032 may store UE security context data for UE 110.

Within HSS 140, processor 1040 may perform processing for the HSS, memory 1042 may store program codes and data for the HSS, and communication unit 1044 may allow the HSS to communicate with other entities. Processor 1040 may perform or direct all or part of process 800 in FIG. 8 and/or other processes for the techniques described herein. Processor 1040 may also perform all or part of the processing for the MME/HSS in call flow 400 in FIGS. 4A and 4B and call flow 500 in FIGS. 5A and 5B. Memory 1042 may store subscription-related information and security information for UE 110.

Within serving gateway 150, processor 1050 may perform processing for the gateway, memory 1052 may store program codes and data for the gateway, and communication unit 1054 may allow the gateway to communicate with other entities.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    performing a security procedure with a wireless network of a first network type for a first session and generating user equipment (UE) security context data at a UE;
    using the UE security context data for secure communication with the wireless network during the first session;
    storing the UE security context data at the UE upon termination of the first session;
    de-registering at the end of the first session and powering down after the first session; and
    powering up the UE and using the stored UE security context data for registration with the wireless network of the first network type for a second session following the first session;
    wherein the stored UE security context data comprises at least one of a cipher key (CK) used for ciphering and an integrity key (IK) used for integrity protection.

2. The method of claim 1, wherein the using the stored UE security context data for registration comprises
    performing integrity protection for at least one message based on the stored UE security context data, and
    sending the at least one integrity protected message to the wireless network for registration of the UE with the wireless network.

3. The method of claim 1, wherein the using the stored UE security context data for registration comprises
    performing integrity protection for a registration message based on an integrity key in the stored UE security context data, and
    sending the integrity protected registration message to the wireless network for registration of the UE with the wireless network.

4. The method of claim 1, wherein the using the stored UE security context data for registration comprises
    ciphering at least one message based on the stored UE security context data, and
    sending the at least one ciphered message to the wireless network for registration of the UE with the wireless network.

5. The method of claim 1, wherein the using the stored UE security context data for registration comprises
    ciphering at least one parameter of a registration message based on a cipher key in the stored UE security context data, and
    sending the registration message to the wireless network for registration of the UE with the wireless network.

6. The method of claim 1, wherein the using the stored UE security context data for registration comprises
    ciphering at least one parameter of a registration message based on a cipher key in the stored UE security context data,
    performing integrity protection for the registration message based on an integrity key in the stored UE security context data, and
    sending the integrity protected registration message comprising the at least one ciphered parameter to the wireless network for registration of the UE with the wireless network.

7. The method of claim 1, wherein the performing the security procedure with the wireless network comprises performing an Authentication and Key Agreement (AKA) procedure with the wireless network.

8. The method of claim 1, wherein the stored UE security context data further comprises at least one of a key set identifier (KSI), and a temporary UE identity.

9. An apparatus for wireless communication, comprising:
    at least one hardware processor configured to perform a security procedure with a wireless network of a first network type for a first session and to generate user equipment (UE) security context data at a UE, to use the UE security context data for secure communication with the wireless network during the first session, to store the UE security context data at the UE upon termination of the first session, to de-register the UE at the end of the first session and power down the UE after the first session, and to power up the UE and use the stored UE security context data for registration of the UE with the wireless network of the first network type for a second session following the first session;
    wherein the stored UE security context data comprises at least one of a cipher key (CK) used for ciphering and an integrity key (IK) used for integrity protection.

10. The apparatus of claim 9, wherein the at least one hardware processor is configured to perform integrity protection for a registration message based on the stored UE security context data, and to send the integrity protected registration message to the wireless network for registration of the UE with the wireless network.

11. The apparatus of claim 9, wherein the at least one hardware processor is configured to cipher information for a registration message based on the stored UE security context data, and to send the registration message comprising the ciphered information to the wireless network for registration of the UE with the wireless network.

12. The apparatus of claim 9, wherein the at least one hardware processor is configured to cipher information for a registration message based on a cipher key in the stored UE security context data, to perform integrity protection for the registration message based on an integrity key in the stored UE security context data, and to send the integrity protected registration message comprising the ciphered information to the wireless network for registration of the UE with the wireless network.

13. An apparatus for wireless communication, comprising:
    means for performing a security procedure with a wireless network of a first network type for a first session and generating user equipment (UE) security context data at a UE;
    means for using the UE security context data for secure communication with the wireless network during the first session;
    means for storing the UE security context data at the UE upon termination of the first session;
    means for de-registering the UE at the end of the first session and powering down the UE after the first session; and
    means for powering up the UE and using the stored UE security context data for registration of the UE with the wireless network of the first network type for a second session following the first session;
wherein the stored UE security context data comprises at least one of a cipher key (CK) used for ciphering and an integrity key (IK) used for integrity protection.

14. The apparatus of claim 13, wherein the means for using the stored UE security context data for registration comprises
means for performing integrity protection for a registration message based on the stored UE security context data, and
means for sending the integrity protected registration message to the wireless network for registration of the UE with the wireless network.

15. The apparatus of claim 13, wherein the means for using the stored UE security context data for registration comprises
means for ciphering information for a registration message based on the stored UE security context data, and
means for sending the registration message comprising the ciphered information to the wireless network for registration of the UE with the wireless network.

16. The apparatus of claim 13, wherein the means for using the stored UE security context data for registration comprises
means for ciphering information for a registration message based on a cipher key in the stored UE security context data,
means for performing integrity protection for the registration message based on an integrity key in the stored UE security context data, and
means for sending the integrity protected registration message comprising the ciphered information to the wireless network for registration of the UE with the wireless network.

17. A computer program product, comprising:
a non-transitory computer-readable medium comprising:
code for causing at least one computer to perform a security procedure with a wireless network of a first network type for a first session and to generate user equipment (UE) security context data at a UE,
code for causing at least one computer to use the UE security context data for secure communication with the wireless network during the first session,
code for causing the at least one computer to store the UE security context data at the UE upon termination of the first session,
code for causing the at least one computer de-register the UE at the end of the first session; and
code for causing the at least one computer to use the stored UE security context data after powering up the UE for registration of the UE with the wireless network of the first network type for a second session following the first session;
wherein the stored UE security context data comprises at least one of a cipher key (CK) used for ciphering and an integrity key (IK) used for integrity protection.

18. A method for wireless communication in a wireless network of a first network type, comprising:
performing a security procedure with a user equipment (UE) for a first session and obtaining UE security context data at a network entity;
using the UE security context data for secure communication with the UE during the first session;
storing the UE security context data at the network entity upon termination of the first session;
de-registering the UE at the end of the first session; and
using the stored UE security context data for registration of the UE for a second session following the first session and powering down and powering up the UE;
wherein the stored UE security context data comprises at least one of a cipher key (CK) used for ciphering and an integrity key (IK) used for integrity protection.

19. The method of claim 18, wherein the using the stored UE security context data for registration comprises
receiving at least one message integrity protected by the UE, and
performing integrity check for the at least one message based on the stored UE security context data.

20. The method of claim 18, wherein the using the stored UE security context data for registration comprises
receiving a registration message integrity protected by the UE, and
performing integrity check for the registration message based on an integrity key in the stored UE security context data.

21. The method of claim 18, wherein the using the stored UE security context data for registration comprises
receiving at least one message ciphered by the UE, and
deciphering the at least one message based on the stored UE security context data.

22. The method of claim 18, wherein the using the stored UE security context data for registration comprises
receiving a registration message from the UE, and
deciphering at least one parameter of the registration message based on a cipher key in the stored UE security context data.

23. The method of claim 18, wherein the using the stored UE security context data for registration comprises
receiving a registration message from the UE,
deciphering at least one parameter of the registration message based on a cipher key in the stored UE security context data, and
performing integrity check for the registration message based on an integrity key in the stored UE security context data.

24. The method of claim 18, wherein the performing the security procedure with the UE comprises performing an Authentication and Key Agreement (AKA) procedure with the UE.

25. The method of claim 18, wherein the stored UE security context data comprises at least one of a cipher key (CK) used for ciphering, an integrity key (IK) used for integrity protection, a key set identifier (KSI), and a temporary UE identity.

26. An apparatus for wireless communication in a wireless network of a first network type, comprising:
at least one hardware processor configured to perform a security procedure with a user equipment (UE) for a first session and obtain UE security context data at a network entity, to use the UE security context data for secure communication with the UE during the first session, to store the UE security context data at the network entity upon termination of the first session, to de-register the UE at the end of the first session, and to use the stored UE security context data for registration of the UE for a second session following the first session and powering down and powering up the UE;
wherein the stored UE security context data comprises at least one of a cipher key (CK) used for ciphering and an integrity key (IK) used for integrity protection.

27. The apparatus of claim 26, wherein the at least one hardware processor is configured to receive a registration message integrity protected by the UE, and to perform integrity check for the registration message based on the stored UE security context data.

28. The apparatus of claim 26, wherein the at least one hardware processor is configured to receive a registration message comprising ciphered information from the UE, and to decipher the ciphered information in the registration message based on the stored UE security context data.

29. The apparatus of claim 26, wherein the at least one hardware processor is configured to receive a registration message comprising ciphered information from the UE, to decipher the ciphered information in the registration message based on a cipher key in the stored UE security context data, and to perform integrity check for the registration message based on an integrity key in the stored UE security context data.

30. The apparatus of claim 26, wherein the wireless network of a first network type comprises a wireless network that implements 3GPP Long Term Evolution (LTE).

31. The method of claim 18, wherein the wireless network of a first network type comprises a wireless network that implements 3GPP Long Term Evolution (LTE).

32. The method of claim 1, wherein the wireless network of a first network type comprises a wireless network that implements 3GPP Long Term Evolution (LTE).

33. The apparatus of claim 9, wherein the wireless network of a first network type comprises a wireless network that implements 3GPP Long Term Evolution (LTE).

34. The apparatus of claim 13, wherein the wireless network of a first network type comprises a wireless network that implements 3GPP Long Term Evolution (LTE).

35. The computer program product of claim 17, wherein the wireless network of a first network type comprises a wireless network that implements 3GPP Long Term Evolution (LTE).

* * * * *